United States Patent Office 3,183,229
Patented May 11, 1965

3,183,229
HYDRAZONES DERIVED FROM 1-AMINO-4-DI-
PHENYLALKYLPIPERAZINES AND HETERO-
CYCLIC ALDEHYDES AND KETONES
John W. Cusic, Skokie, and Ernest F. Le Von, Morton
Grove, Ill., assignors to G. D. Searle & Co., Chicago,
Ill., a corporation of Delaware
No Drawing. Filed Apr. 4, 1963, Ser. No. 270,562
Claims priority, application Philippines, Sept. 17, 1962,
4,397
16 Claims. (Cl. 260—240)

The present application is a continuation-in-part of application Serial No. 142,006, filed October 2, 1961, now abandoned.

The present invention relates to a novel group of compounds which are hydrazones derived from 1-amino-4-diphenylalkylpiperazines and heterocyclic aldehydes or ketones. More particularly, it relates to compounds having the following general formula

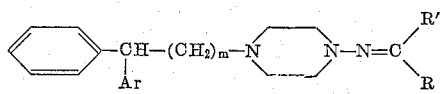

wherein Ar is selected from the group consisting of phenyl, halophenyl, tolyl, methoxyphenyl, trifluoromethylphenyl and pyridyl; $m$ is a whole number between 0 and 1 inclusive; R is any monocyclic or dicyclic heterocyclic radical with the free valence on a carbon atom or, when combined with R', R represents an alkylene group which includes a heterocyclic atom such that when additionally joined by a carbon group then RCOR' represents a cyclic ketone; R' is selected from the group consisting of hydrogen and the radical obtained by combination with R in the manner indicated above.

Thus, R can represent pyridyl, methylpyridyl, quinolyl, the aforementioned heterocyclic radicals as their N-oxides (i.e., 1-oxidopyridyl, 1-oxidomethylpyridyl, and 1-oxidoquinolyl), indolyl, N-methylpyrrolyl, N-phenyl dimethylpyrrolyl, thienyl, furyl, nitrofuryl, dihydropyranyl, and, when combined with R', 3-methyl-3-azapentamethylene. The halophenyl radicals referred to above include fluorophenyl, chlorophenyl, bromophenyl, and iodophenyl.

The compounds of this invention possess valuable anticonvulsant properties. In particular, they are highly active inhibitors of pentylenetetrazol-induced convulsions. In addition, they antagonize electroshock seizures and seizures produced by styrchnine. In addition, those compounds wherein $m$ is one possess antibiotic properties which are demonstrated by their inhibition of the growth of the organisms *Diplococcus pneumoniae* and *Chlorella vulgaris*, and their inhibition of the germination of seeds of Trifolium.

A particularly preferred embodiment of this invention are those compounds in which R is pyridyl or methylpyridyl, and the corresponding N-oxides.

The organic bases of this invention form non-toxic addition salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids.

The compounds of this invention are conveniently prepared by the condensation of a 1-substituted-4-amino-piperazine with an appropriate aldehyde or ketone. The reaction is conveniently carried out in an inert solvent. That is, the reaction is carried out in a solvent which will not react with the aldehydes, ketones or hydrazines used. Useful solvents for this reaction are alcohols such as ethanol and 2-propanol and aromatic hydrocarbons such as benzene and toluene. Optionally, the reaction can be carried out in the presence of a small amount of acid which serves to promote the reaction. Acetic acid is an example of an acid useful for this purpose.

Although aldehydes and ketones are the most convenient starting materials for use in this reaction, carbonyl derivatives are also useful. For example, it is possible to use acetals, ketals, diacetates, and other carbonyl derivatives which can be readily converted to carbonyl compounds in the reaction mixture. Nitrones, which can be converted to carbonyl compounds in the reaction mixture, are also useful. Particularly useful in this regard are compounds such as N-(4-dimethylaminophenyl)-α-(N-oxidopyridyl)nitrones.

The compounds which constitute this invention and their preparation will appear more fully from a consideration of the following examples which are given for the purpose of illustration and are not to be construed as limiting the invention in spirit or in scope. In the examples, quantities are in parts by weight unless parts by volume are indicated, temperatures are in degrees centigrade (° C.), and pressures in millimeters of mercury (mm.). The relationship between parts by volume and parts by weight is the same as that between milliliters and grams.

*Example 1*

A mixture of 46 parts of 2-chlorobenzhydryl chloride, 50 parts of piperazine, 30 parts of potassium carbonate, 3 parts of sodium iodide and 480 parts of butanone is stirred and refluxed for 48 hours. The reaction mixture is filtered and the solvent is evaporated from the filtrate. The residue is distributed between benzene and water and the benzene layer is separated and washed with water. It is then extracted twice with 3 N hydrochloric acid and the acid extract is washed with benzene, alkalized, and extracted with benzene. The benzene solution is washed and dried and the solvent is evaporated to give 1-(2-chlorobenzhydryl)piperazine.

If the above procedure is repeated using the appropiate substituted chloride in place of the 2-chlorobenzhydryl chloride, the following compounds are obtained:

1-(4-methylbenzhydryl)piperazine.
1-(4-fluorobenzhydryl)piperazine.
1-(4-iodobenzhydryl)piperazine.
1-[α-(2-pyridyl)benzyl]piperazine.
1-[α-(3-pyridyl)benzyl]piperazine.

*Example 2*

To a suspension of 200 parts of 1-benzhydrylpiperazine and 400 parts of water is added gradually 190 parts of concentrated hydrochloric acid with cooling in an ice bath. The resultant mixture is stirred for 1 hour, the insoluble material is filtered off and the filtrate is cooled to 10° C. A solution of 57 parts of sodium nitrite in 200 parts of water is added portionwise over a period of 3 hours. The precipitate which forms is filtered off, washed with dilute hydrochloric acid and dried overnight. Recrystallization of the product from 790 parts of absolute ethanol gives the purified hydrochloride which is then suspended in 1000 parts of water and 1760 parts of benzene. A slight excess of aqueous sodium hydroxide is added and the mixture is stirred until all the solid has dissolved. The benzene solution is separated, washed with water, and dried and the solvent is evaporated. The residual base is recrystallized from heptane to give 1-benzhydryl-4-nitrosopiperazine melting at about 110–111° C.

If the above procedure is repeated using the appropriate 1-substituted piperazine, the following compounds are obtained:

1-(4-methylbenzhydryl)-4-nitrosopiperazine.
1-(4-fluorobenzhydryl)-4-nitrosopiperazine.
1-(2-chlorobenzhydryl)-4-nitrosopiperazine melting at about 117–119° C.
1-(4-iodobenzhydryl)-4-nitrosopiperazine.
1-[α-(3-pyridyl)benzyl]-4-nitrosopiperazine.
1-[α-(2-pyridyl)benzyl]-4-nitrosopiperazine.

*Example 3*

A solution of 86 parts of 1-(4-chlorobenzhydryl)piperazine and 500 parts of water containing 24 parts of hydrogen chloride is nitrosated with 21 parts of sodium nitrite in 100 parts of water. The reaction mixture is made alkaline by the addition of sodium hydroxide solution and an oily layer forms. The oily product is separated and crystallized from a mixture of 45 parts of ethyl acetate and 700 parts of n-heptane. The resultant solid is recrystallized from a mixture of 2-propanol and hexane and then from a mixture of ethyl acetate and heptane to give 1-(4-chlorobenzhydryl)-4-nitrosopiperazine melting at about 121–123° C.

*Example 4*

A solution of 10 parts of 1-benzhydryl-4-nitrosopiperazine in 140 parts of anhydrous ether and 5 parts of benzene is added portionwise to a suspension of 1.9 parts of lithium aluminum hydride in 140 parts of ether. The reaction mixture is stirred for 1 hour at room temperature and then refluxed and stirred for 2 hours. The reaction mixture is cooled in an ice bath and excess lithium aluminum hydride is decomposed by the addition of ethyl acetate. The reaction mixture is hydrolyzed by the dropwise addition of 2 parts of water, 2 parts of 20% sodium hydroxide solution and 6 parts of water. The inorganic salts are filtered off and washed with ether and the resultant filtrate is dried over sodium sulfate. The solvent is evaporated, the residue is dissolved in benzene and the solvent is evaporated once again to give 1-benzhydryl-4-aminopiperazine melting at about 106–109° C.

If equivalent quantities of the appropriate 1-substituted 4-nitrosopiperazine are used in the above procedure, the following compounds are obtained. Modifications of the procedure used are noted after the compound obtained.

1-(4-methylbenzhydryl)-4-aminopiperazine.
1-(4-fluorobenzhydryl)-4-aminopiperazine.
1-(2-chlorobenzhydryl)-4-aminopiperazine. In this case tetrahydrofuran is used in place of benzene to dissolve the nitroso compound.
1-(4-chlorobenzhydryl)-4-aminopiperazine melting at about 116–121° C.
1-(4-iodobenzhydryl)-4-aminopiperazine.
1-[α-(2-pyridyl)benzyl]-4-aminopiperazine. In this case the reduction is carried out in tetrahydrofuran.
1-[α-(3-pyridyl)benzyl]-4-aminopiperazine.

*Example 5*

A mixture of 110 parts of triethylamine, 36 parts of 1-nitrosopiperazine and 375 parts of chloroform is heated to 60–65° C. A solution of 70 parts of diphenylacetyl chloride in 150 parts of chloroform is then added portionwise. The resultant mixture is heated at 70–75° C. for an additional 3 hours and it is then cooled to room temperature. An additional 25 parts of chloroform is added and the resultant mixture is washed with several portions of water. The chloroform layer is dried and the solvent is evaporated to give the crude solid product. This solid is washed with ether to give 1-diphenylacetyl-4-nitrosopiperazine melting at about 149–151° C.

16 parts of 1-diphenylacetyl-4-nitrosopiperazine is placed in the thimble of a continuous extractor and a solution of 15 parts of lithium aluminum hydride in 875 parts of ether is placed in the flask of the extractor. The ether solution is refluxed for 21 hours to bring the nitroso compound into contact with the reducing mixture. The ether solution is then cooled to 5° C. and decomposed by the cautious addition of water. The ether layer is separated and dried and the solvent is evaporated to give 1-(2,2-diphenylethyl)-4-aminopiperazine as an oil. This product is used without further purification.

If 4-chlorodiphenylacetyl chloride is substituted for the diphenylacetyl chloride and the procedure of the preceding two paragraphs is repeated, there is obtained 1-[2-(4-chlorophenyl)-2-phenylethyl]-4-aminopiperazine.

*Example 6*

12 parts of 1-benzhydryl-4-aminopiperazine and 4.9 parts of pyridine-4-carboxaldehyde are dissolved in 120 parts of hot 2-propanol. The mixture is cooled and a crystalline solid precipitates from the solution. The solid is filtered from the mixture; the solvent is evaporated from the filtrate to give additional crude solid. The two batches of solid thus obtained are combined and recrystallized from a mixture of hexane and heptane to give 1-benzyhydryl-4-(4-pyridylmethyleneamino)piperazine melting at about 126–127° C. This compound has the following formula

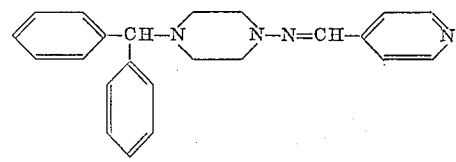

*Example 7*

4 parts of 1-benzhydryl-4-(4-pyridylmethyleneamino)piperazine is dissolved in 32 parts of hot 2-propanol and a solution of 1.3 parts of maleic acid in 16 parts of 2-propanol is added. The maleate salt crystallizes from the solution as orange needles. The precipitate is separated by filtration, washed with 2-propanol and then with n-hexane and then dried under vacuum to give the maleate salt of 1-benzhydryl-4-(4-pyridylmethyleneamino)piperazine melting at about 165–167° C.

*Example 8*

A solution of 10 parts of 1-benzyhydryl-4-aminopiperazine in 25 parts of 3 N hydrochloric acid and 100 parts of water is prepared. A solution of 5 parts of pyridine-4-carboxaldehyde in 50 parts of water is added slowly and this is followed by the addition of a solution of 6.4 parts of sodium acetate in 25 parts of water. The solid which precipitates is separated and recrystallized first from aqueous methanol and then from n-hexane to give 1-benzhydryl-4-(4-pyridylmethyleneamino)piperazine melting at about 125–127° C.

*Example 9*

A solution of 10 parts of 1-benzhydryl-4-aminopiperazine and 4 parts of pyridine-3-carboxaldehyde in 440 parts of benzene is refluxed in a vessel provided with an azeotrope trap. Refluxing is continued until no more water separates from the reaction mixture. The solvent is then evaporated from the benzene solution and the residual material is crystallized from heptane to give yellow crystals of 1-benzhydryl-4-(3-pyridylmethyleneamino)piperazine melting at about 127–135° C.

If 4 parts of pyridine-2-carboxaldehyde is substituted for the 4 parts of pyridine-3-carboxaldehyde and the above procedure is repeated, the product is 1-benzhydryl-4-(2-pyridylmethyleneamino)piperazine melting at about 156–159° C.

*Example 10*

An equivalent quantity of 1-(4-fluorobenzylhydryl)-4-aminopiperazine is substituted for the 1-benzhydryl-4-aminopiperazine of Example 9 and the procedure of Example 9 is repeated. The product is 1-(4-fluorobenzhydryl)-4-(3-pyridylmethyleneamino)piperazine.

In the same manner, 1-(4-iodobenzhydryl)-4-aminopiperazine reacts with pyridine-3-carboxaldehyde to give 1-(4 - iodobenzhydryl) - 4 - (3 - pyridylmethyleneamino)-piperazine. This compound has the following formula

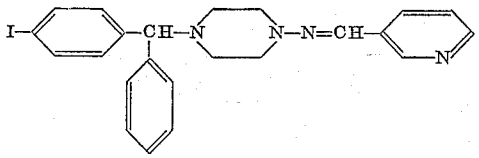

*Example 11*

If an equivalent quantity of 1-(2-chlorobenzhydryl)-4-aminopiperazine is substituted for the 1-benzhydryl-4-aminopiperazine of Example 9 and the procedure of that example is repeated, the product is 1-(2-chlorobenzhydryl)-4-(3-pyridylmethyleneamino)piperazine.

Likewise, 1-(4-chlorobenzhydryl) - 4 - aminopiperazine reacts with pyridine-3-carboxaldehyde to give 1-(4-chlorobenzhydryl) - 4 - (3 - pyridylmethyleneamino)piperazine melting at about 114–119° C.

In the same manner, 1-(4-methylbenzhydryl)-4-aminopiperazine reacts with pyridine-4-carboxaldehyde to give 1-(4-methylbenzhydryl)-4 - (4 - pyridylmethyleneamino)-piperazine. This compound has the following formula

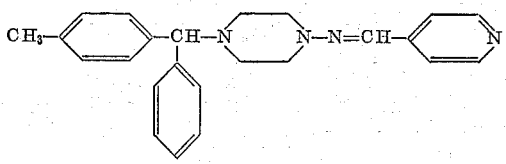

*Example 12*

A solution of 20 parts of 1-(4-chlorobenzhydryl)-4-aminopiperazine and 7.2 parts of pyridine-4-carboxaldehyde in 530 parts of benzene is refluxed for 1.5 hours in a vessel provided with an azeotrope trap. The resultant solution is cooled and filtered and the solvent is evaporated. The residual yellow oil is dissolved in 80 parts of hot 2-propanol and a solution of 7.7 parts of maleic acid and 55 parts of 2-propanol is added. The maleate salt crystallizes from the solution and it is separated by filtration and dried under reduced pressure. The product thus obtained is the maleate salt of 1-(4-chlorobenzhydryl) - 4 - (4 - pyridylmethyleneamino)piperazine and it melts at about 142–144° C.

*Example 13*

2 parts of crude 1-(4-chlorobenzhydryl)-4-(3-pyridylmethyleneamino)piperazine is dissolved in 12 parts of methanol and 4 parts of methyl iodide is added. The mixture is heated for 20 minutes on a steam bath and the solvent is evaporated. The residue is mixed with an additional 16 parts of methanol and 4 parts of methyl iodide and boiled for 1 hour. The solvent is evaporated and the residue is recrystallized from methanol to give 1 - (4 - chlorobenzhydryl) - 4 - (3 - pyridylmethyleneamino)piperazine methiodide melting at about 205–210° C.

*Example 14*

If an equivalent quantity of 2-methylpyridine-4-carboxaldehyde is substituted for the pyridine-3-carboxaldehyde and the procedure of Example 9 is repeated, the product is 1-benzhydryl-4-(2-methyl-4-pyridylmethyleneamino)piperazine.

Likewise, substitution of 6-methylpyridine-2-carboxaldehyde for the pyridine-3-carboxaldehyde of Example 9 gives 1-benzhydryl - 4 - (6 - methyl - 2 - pyridylmethyleneamino)piperazine melting at about 105–107° C. This compound has the following formula

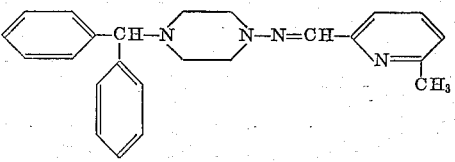

*Example 15*

Pyridine-4-carboxaldehyde is reacted with 1-(2,2-diphenylethyl)-4-aminopiperazine and with 1-[2-(4-chlorophenyl)-2-phenylethyl]-4-aminopiperazine according to the procedure described in Example 6. A drop of acetic acid is included in the reaction mixture as catalyst. The products thus obtained are converted to the corresponding maleate salts by the procedure described in Example 7. The final products obtained in this way are the dimaleate salt of 1-(2,2-diphenylethyl)-4-(4-pyridylmethyleneamino)piperazine melting at about 152–153° C., and the dimaleate salt of 1-[2-(4-chlorophenyl)-2-phenylethyl] - 4 - (4 - pyridylmethyleneamino)piperazine melting at about 144–145° C.

In a similar way, 1-[α-(2-pyridyl)benzyl]-4-(4-pyridylmethyleneamino)piperazine and 1-[α-(3-pyridyl)benzyl]-4 - (4 - pyridylmethyleneamino)piperazine are obtained from the reaction of pyridine-4-carboxaldehyde with 1-[α-(2-pyridyl)benzyl]-4-aminopiperazine and 1-[α-(3-pyridyl)benzyl]-4-aminopiperazine, respectively.

*Example 16*

A solution of 0.9 part of 1-benzhydryl-4-aminopiperazine in 2 parts by volume of 3 N hydrochloric acid is added to a solution of 0.9 part of N-(4-dimethylaminophenyl)-α-(1-oxido-4-pyridyl)nitrone in 5 parts by volume of 3 N hydrochloric acid and 12 parts of water. A yellow solid precipitates and this is separated by filtration. The solid is then mixed with an aqueous solution containing 10 parts of potassium carbonate and the resultant alkaline solution is extracted with 220 parts of benzene. The benzene extract is washed with water and dried over potassium carbonate and the solvent is removed under reduced pressure. The residue is recrystallized first from a mixture of ether and n-hexane, and then twice from a mixture of ethyl acetate and cyclohexane. The product thus obtained is dried under reduced pressure to give 1-benzhydryl - 4 - [(1 - oxide - 4 - pyridyl)methyleneamino]piperazine melting at about 179–180.5° C. This compound has the following formula

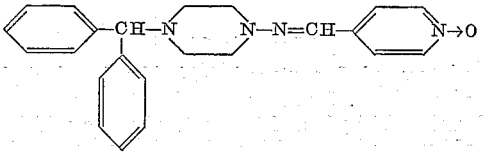

In a similar manner, N-(4-dimethylaminophenyl)-α-(1-oxido-4-pyridyl)nitrone is reacted with 1-(2,2-diphenylethyl)-4-aminopiperazine,
1-[2-(4-chlorophenyl)-2-phenylethyl]-4-aminopiperazine, and
1-(4-chlorobenzhydryl)-4-aminopiperazine to give, respectively,
1-(2,2-diphenylethyl)-4-[(1-oxido-4-pyridyl)methyleneamino]piperazine,
1-[2-(4-chlorophenyl)-2-phenylethyl]-4-[(1-oxido-4-pyridyl)methyleneamino]piperazine and
1-(4-chlorobenzhydryl)-4-[(1-oxido-4-pyridyl)methyleneamino]piperazine.

The 1 - (4 - chlorobenzhydryl) - 4 - [(1 - oxide - 4 - pyridyl)methyleneamino]piperazine melts at about 174–179° C. after recrystallization first from a mixture of ethyl acetate and ether and then from a mixture of benzene and ether.

Likewise, N - (4 - dimethylaminophenyl) - α - (1 - oxido - 2 - pyridyl)nitrone is reacted with 1 - benzhydryl - 4 - aminopiperazine and 1 - (4 - chlorobenzhydryl) - 4 - aminopiperazine to give 1 - benzhydryl - 4 - [(1 - oxido-2 - pyridyl)methyleneamino]piperazine and 1 - (4 - chlorobenzhydryl) - 4 - [(1 - oxido - 2 - pyridyl)methyleneamino]piperazine.

Using the appropriate nitrones, analogous products can be obtained having a 1-oxido methylpyridyl or a 1-oxidoquinolyl group in place of the 1-oxidopyridyl structure in the compounds described above.

*Example 17*

If an equivalent quantity of indole-3-carboxaldehyde is substituted for the pyridine-3-carboxaldehyde and the procedure of Example 9 is repeated, the product is 1-benzhydryl-4-(3-indolylmethyleneamino)piperazine melting at about 212–214° C.

*Example 18*

An equivalent quantity of quinoline-4-carboxaldehyde is substituted for the pyridine-3-carboxaldehyde and the procedure of Example 9 is repeated. The product obtained is 1-benzhydryl-4-(4-quinolylmethyleneamino)-piperazine melting at about 132–135° C.

Similarly, quinoline-2-carboxaldehyde reacts with 1-benzhydryl - 4 - aminopiperazine to give 1 - benzhydryl-4-(2-quinolylmethyleneamino)piperazine. This compound melts at about 168–171° C. after recrystallization from a mixture of benzene and n-heptane.

*Example 19*

A solution of 4.8 parts of 1-(4-chlorobenzhydryl)-4-aminopiperazine and 1.8 parts of N-methylpyrrole-2-carboxaldehyde in 40 parts of 2-propanol is warmed briefly and then allowed to cool. The solvent is evaporated from the resultant solution under reduced pressure and the residual amorphous material is chromatographed on alumina. The column is eluted with benzene and the residue obtained after evaporation of the solvent from the benzene eluate is crystallized twice from cyclohexane to give 1-(4-chlorobenzhydryl)-4-(1-methyl-2-pyrrolylmethyleneamino)-piperazine melting at about 72–78° C. This product contains ½ mole of cyclohexane. The free base has the following formula

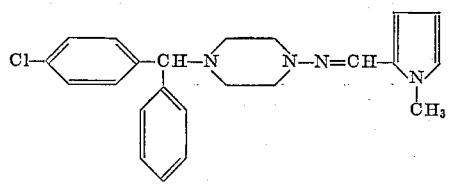

*Example 20*

A mixture of 8 parts of 1-(4-chlorobenzhydryl)-4-aminopiperazine, 5.3 parts of 2,5-dimethyl-1-phenyl-pyrrole-3-carboxaldehyde and 1.6 parts of acetic acid in 250 parts of benzene is heated for 1 hour in a vessel equipped with an azeotrope trap. The resultant solution is treated with charcoal, washed with potassium carbonate solution and with water, and then dried over potassium carbonate. The solvent is evaporated from the solution under reduced pressure and the residue is crystallized first from cyclohexane and then from a mixture of ether and n-pentane to give 1-(4-chlorobenzhydryl)-4-(2,5-dimethyl-1-phenyl-3-pyrrolylmethyleneamino)piperazine melting at about 122–125° C. This compound has the following formula

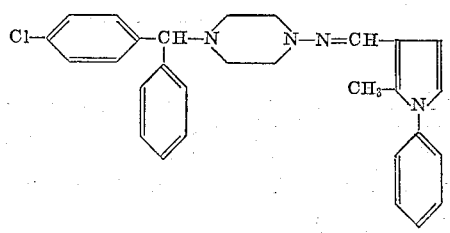

*Example 21*

If an equivalent quantity of thiophene-2-carboxaldehyde is substituted for the pyridine-3-carboxaldehyde and the procedure of Example 9 is repeated, the product obtained is 1-benzhydryl-4-(2-thenylideneamino)piperazine melting at about 137–140° C. This compound has the following formula

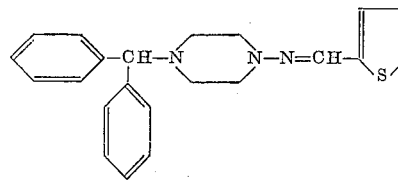

*Example 22*

An equivalent quantity of furfural is substituted for the pyridine-4-carboxaldehyde of Example 6 and the procedure of Example 6 is repeated. The product is 1-benzhydryl-4-(furfurylideneamino)piperazine melting at about 109–111° C.

*Example 23*

8 parts of 1-benzhydryl-4-aminopiperazine is dissolved in 40 parts of 2-propanol and heated to 45° C. At the same time 7.5 parts of 5-nitrofurfurylidene diacetate is dissolved in a mixture of 80 parts of 2-propanol and 45 parts of benzene and heated to about 45° C. The two warm solutions are combined and heated gently on a steam bath for 3 hours. The mixture is allowed to cool and the crystalline precipitate which forms is filtered off and dissolved in 20 parts of benzene. The hot benzene solution is filtered and diluted with 40 parts of hot 2-propanol. The resultant mixture, on cooling, gives 1-benzhydryl - 4 - (5 - nitrofurfurylideneamino)piperazine melting at about 163.5–164.5° C.

*Example 24*

An equivalent quantity of 3,4-dihydro-2H-pyran-2-carboxaldehyde is substituted for the pyridine-3-carboxaldehyde and the procedure of Example 9 is repeated. Isolation of the product gives 1-benzhydryl-4-(3,4-dihydro-2-(2H) - pyranylmethyleneamino)piperazine melting at about 132–134° C. This compound has the following formula

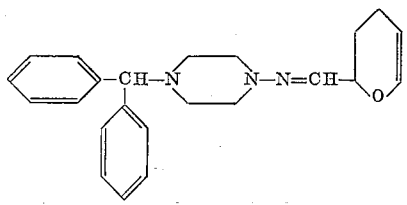

*Example 25*

If an equivalent quantity of N-methyl-4-piperidone is substituted for the pyridine-4-carboxaldehyde and the procedure of Example 6 is repeated, the product is 1-benzhydryl - 4 - (4-methyl-4-azacyclohexylideneamino)-piperazine melting at about 133–134° C.

What is claimed is:
1. A compound of the formula

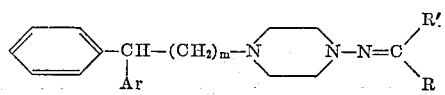

wherein Ar is selected from the group consisting of phenyl, halophenyl, tolyl, and pyridyl; R is selected from the group consisting of pyridyl, methylpyridyl, quinolyl, the N-oxides of the preceding heterocyclic groups, indolyl, N-methylpyrrolyl, N-phenyl-2,5-dimethylpyrrolyl, thienyl, furyl, nitrofuryl, dihydropyranyl, and, when combined with R', 3-methyl-3-azapentamethylene; R' is selected from the group consisting of hydrogen and, when combined with R, 3-methyl-3-azapentamethylene; m is a whole number between 0 and 1 inclusive.

2. A compound of the formula

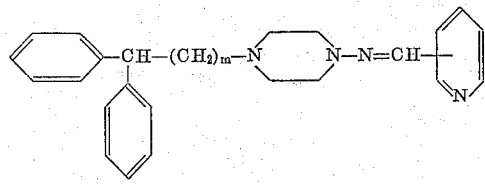

wherein m is a whole number between 0 and 1 inclusive.

3. 1 - benzhydryl - 4 - (4 - pyridylmethyleneamino)-piperazine.

4. 1 - (2,2 - diphenylethyl) - 4 - (4 - pyridylmethyleneamino)piperazine.

5. A compound of the formula

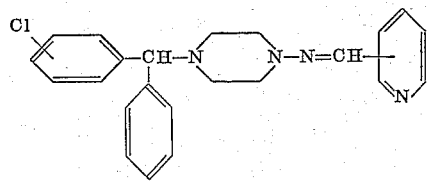

6. 1 - (4 - chlorobenzhydryl) - 4 - (4 - pyridylmethyleneamino)piperazine.

7. 1 - [2 - (4 - chlorophenyl) - 2 - phenylethyl] - 4 - (4-pyridylmethyleneamino)piperazine.

8. A compound of the formula

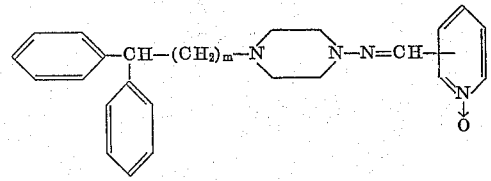

wherein m is a whole number between 0 and 1 inclusive.

9. 1 - benzhydryl - 4 - [(1 - oxido - 4 - pyridyl)-methyleneamino]piperazine.

10. A compound of the formula

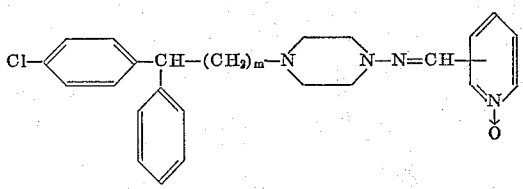

wherein m is a whole number between 0 and 1 inclusive.

11. 1 - (4 - chlorobenzhydryl) - 4 - [(1 - oxido - 4-pyridyl)methyleneamino]piperazine.

12. A compound of the formula

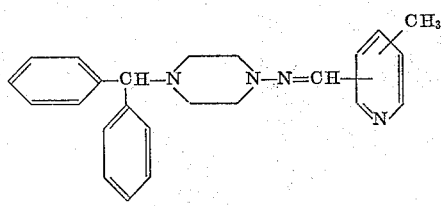

13. 1 - benzhydryl - 4 - (6 - methyl - 2 - pyridylmethyleneamino)piperazine.

14. A compound of the formula

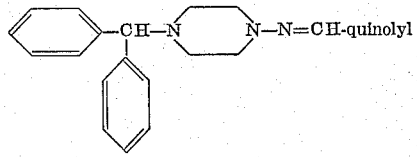

15. 1 - benzhydryl - 4 - (4 - quinolylmethyleneamino)-piperazine.

16. 1 - (4 - methylbenzhydryl) - 4 - (4 - pyridylmethyleneamino)piperazine.

References Cited by the Examiner

UNITED STATES PATENTS

| | | | |
|---|---|---|---|
| 2,663,706 | 12/53 | Conroy | 260—268 X |
| 2,739,968 | 3/56 | Sperber et al. | 260—240 X |
| 2,967,865 | 1/61 | Rudner | 260—268 |
| 3,076,805 | 2/63 | Michels | 260—240 |
| 3,158,609 | 11/64 | Hamilton et al. | 260—240 |

FOREIGN PATENTS

| | | |
|---|---|---|
| 920,249 | 11/54 | Germany. |
| 942,029 | 4/56 | Germany. |

WALTER A. MODANCE, *Primary Examiner.*

JOHN D. RANDOLPH, *Examiner.*